US012747377B2

(12) United States Patent
Schulz et al.

(10) Patent No.: US 12,747,377 B2
(45) Date of Patent: Sep. 29, 2026

(54) HIGH-STRENGTH ACRYLIC ADHESIVES INCORPORATING POLYVINYL BUTYRAL

(71) Applicant: Illinois Tool Works Inc., Glenview, IL (US)

(72) Inventors: Gregory Schulz, Glenview, IL (US); Maxwell VanRaaphorst, Glenview, IL (US)

(73) Assignee: Illinois Tool Works Inc., Glenview, IL (US)

( * ) Notice: Subject to any disclaimer, the term of this patent is extended or adjusted under 35 U.S.C. 154(b) by 699 days.

(21) Appl. No.: 18/130,041

(22) Filed: Apr. 3, 2023

(65) Prior Publication Data

US 2023/0323165 A1 Oct. 12, 2023

Related U.S. Application Data

(60) Provisional application No. 63/328,352, filed on Apr. 7, 2022.

(51) Int. Cl.

| | |
|---|---|
| ***C09J 133/06*** | (2006.01) |
| ***B32B 7/12*** | (2006.01) |
| ***B32B 15/01*** | (2006.01) |
| ***B32B 37/12*** | (2006.01) |
| ***C09J 5/00*** | (2006.01) |
| ***C09J 11/08*** | (2006.01) |

(52) U.S. Cl.

CPC ............. *C09J 133/064* (2013.01); *B32B 7/12* (2013.01); *B32B 15/01* (2013.01); *B32B 37/1284* (2013.01); *C09J 5/00* (2013.01); *C09J 11/08* (2013.01); *B32B 2037/1253* (2013.01); *B32B 2255/06* (2013.01); *B32B 2255/26* (2013.01); *B32B 2307/7376* (2023.05); *B32B 2311/24* (2013.01); *C09J 2411/00* (2013.01); *C09J 2431/00* (2013.01); *C09J 2433/00* (2013.01); *C09J 2453/00* (2013.01); *C09J 2463/00* (2013.01)

(58) Field of Classification Search

None

See application file for complete search history.

(56) References Cited

U.S. PATENT DOCUMENTS

2014/0231009 A1* 8/2014 Chitnavis ............... C09J 147/00
156/332

FOREIGN PATENT DOCUMENTS

| | | | |
|---|---|---|---|
| CN | 103971784 B | * | 8/2016 |
| JP | 3934701 | * | 6/2007 |
| JP | 5059261 B2 | * | 10/2012 |

* cited by examiner

*Primary Examiner* — Tae H Yoon

(74) *Attorney, Agent, or Firm* — MaxGoLaw PLLC

(57) ABSTRACT

A two-part formulation of a high strength acrylic adhesive that includes a Part A and Part B. The Part A includes at least one curable monomer of: Part A acrylate monomer, methacrylate monomer, acrylic acid monomer, methacrylic acid monomer, or a combination thereof; a Part A impact modifier; and a Part A adhesion promoter. A Part B includes impact modifier, a Part B adhesion promoter, and an induction agent. A polyvinyl acetal resin is present in at least one of Part A or Part B, and present from 1 to 30 total weight percent. A process of applying the resulting adhesive to bond substrates and a resulting structure are also provided.

19 Claims, No Drawings

HIGH-STRENGTH ACRYLIC ADHESIVES INCORPORATING POLYVINYL BUTYRAL

RELATED APPLICATIONS

This application claims priority benefit of U.S. Provisional Application Ser. No. 63/328,352 filed Apr. 7, 2022; the contents of which are hereby incorporated by reference.

FIELD OF THE INVENTION

The present invention in general relates to adhesives and in particular, to free-radical curing acrylic adhesives able to adhere to a variety of substrates and having a surprisingly high adhesive strength through inclusion of polyvinyl butyral.

BACKGROUND OF THE INVENTION

In many industries, manufacturers of mated components have changed to structural adhesives to replace conventional fastening techniques such as rivets, bolts, and welding. Adhesives in theory offer many attractive properties that include improved product performance, aesthetics, some reduced overall assembly time, and lower production costs. Additionally, adhesives preclude much of the stress point concentration, corrosion, and component damage often seen with rivets, bolts, welding, and other traditional fastening methods, yet are often precluded from some applications due the limited bond strength per unit area.

Typically, acrylic adhesives are used in applications where fixture time or time until the part can be handled is critical in a production or repair. Unfortunately, the lower terminal bond strengths achievable with a conventional acrylic adhesive relative to other types of adhesives such as epoxies represents a limitation of the uses thereof.

Thus, there exists a need for a structural acrylic adhesive formulation that can achieve the high terminal bond strengths relative to conventional acrylic adhesive formulations. There further exists a need for a room temperature curing high strength adhesive to replace elevated cure temperature adhesives such as epoxies.

SUMMARY OF THE INVENTION

A two-part formulation of a high strength acrylic adhesive includes a Part A and Part B. The Part A includes at least one curable monomer of: Part A acrylate monomer, methacrylate monomer, acrylic acid monomer, methacrylic acid monomer, or a combination thereof; a Part A impact modifier; and a Part A adhesion promoter. A Part B, in some inventive embodiments, includes at least one curable monomer of: a Part B acrylate monomer, methacrylate monomer, acrylic acid monomer, methacrylic acid monomer, or a combination thereof; a Part B impact modifier; and a Part B adhesion promoter, and an induction agent. A polyvinyl acetal resin that is greater than 60 percent polyvinyl butyral (PVB) as measured by monomer subunit percentage is present in at least one of Part A or Part B, the polyvinyl acetal resin present upon mixing of the Part A and the Part B in an amount of from 1 to 30 total weight percent. In still other inventive embodiments, the Part B is devoid of curable monomers.

A process of applying the resulting adhesive to a substrate includes the components of said Part A and said Part B being mixed together to form an adhesive mixture. The adhesive mixture is applied to the substrate, followed by contacting a second substrate with the adhesive mixture. The adhesive mixture then cures to create a bond between the substrate and the second substrate.

A structure is also provided based on the first substrate adhesively bonded to the second substrate by the cured formulation.

DETAILED DESCRIPTION OF THE INVENTION

The present invention has utility as a curing acrylic adhesive particularly well suited for high strength bonding of structural substrates through inclusion of polyvinyl butyral. Structural substrates operatively bonded by an inventive adhesive may include electrogalvanized steel, hot-dipped galvanized steel, cold-rolled steel, aluminum, aluminum alloys, polyacrylonitrile-butadiene-styrene (ABS), mild steel (MS), polyvinyl chloride (PVC), and fiberglass. An inventive adhesive formulation is appreciated to be operative to bond to like structural substrates, as well as to bond one such substrate to other substrates including other metals, other plastics, and to do so through a rapid handling strength during cure to facilitate handling and removal of fixturing devices in a manufacturing setting. In specific inventive embodiments conductive fillers are incorporated in the adhesive formulation to control electrical conductivity and/or thermal conductivity of the high temperature adhesive. The inclusion of conductive fillers in embodiments of the high strength adhesive provides a conductive adhesive that forms an adhesive bond to electrically conduct a charge between bonded substrates that may then be electric coated (E-Coat)/electrostatic painted or powder coated. The conductive embodiments of the inventive high strength adhesive may also be used to provide electromagnetic field (EMF) shielding by forming a Faraday cage with the bonded conductive surfaces. The conductive embodiments of the inventive adhesive may also provide improved thermal transfer between bonded materials that is advantageous for powder coating or heat dissipation.

Embodiments of the inventive adhesive formulation have a 1-50:1 mix ratio of Parts A to B of a two-part acrylic formulation.

This present invention achieves a surprising result as to the high strengths achieved for acrylic adhesives through inclusion of polyvinyl butyral (PVB) in quantities and a form as detailed herein. Without intending to be bound to a particular theory, PVB inclusions in an acrylic resin having stronger interactions with an acrylic matrix than halogen-containing elastomers and as a result PVB inclusions are exceptionally effective at inhibiting crack propagation.

It is to be understood that in instances where a range of values are provided, the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

As used herein, work life is defined as the time for the material to reach a state of gel as defined by a point in time after the material is first mixed when the storage modulus (G') and the loss modulus (G") are equal as defined by ASTM D7271.

As used herein, molecular weight when used in referring to a polymer is average number molecular weight unless specifically indicated as otherwise.

This invention uses an acrylic adhesive in a two-part adhesive formulation. It is provided as a binary system that includes an adhesive Part A and an activator Part B. The Part A includes a reactive acrylate monomer or oligomer reactant, a polyfunctional monomer or resin, an anti-oxidant, a free-radical polymerization inhibitor, an adhesion promoter, an impact modifier, a polyvinyl butyral resin, and a free-radical polymerization initiator, and optionally a secondary toughening agent. The Part B includes an impact modifier, a reactant monomer, a monomer, an anti-oxidant, and a polymerization accelerator, and optionally a secondary toughening agent. In some inventive embodiments, Part B includes an impact modifier, a chemically inert liquid carrier, a reactive resin and antioxidant, and optionally a second toughening agent. Free-radical polymerization initiators and polymerization accelerators can be added to either Part A or Part B, provided they are in opposite Parts from one another and do not chemically interact with components in the Part to which they are added. In some inventive embodiments, a polyvinyl butyral resin is also present in Part B. The amount of Part B varies in the weight ratio used relative to Part A. Each of the Part A and the Part B has separate storage stabilities of at least 30 days at 23° Celsius. While the present invention is detailed herein with respect to a 10:1 by weight ratio mixture of Part A:Part B it is appreciated that other mix ratios are readily compounded ranging from 50-1:1 Part A:Part B without departing from the spirit of the present invention.

A process of applying an adhesive to a substrate is provided that includes combining together Parts A and B to form an adhesive mixture and applying the mixture to the substrate and allowing the applied mixture to cure.

The adhesive Part A includes, in embodiments, active weight percent of a reactive monomer of acrylate monomer, methacrylate monomer, acrylic acid monomer, methacrylic acid monomer, or a combination thereof. In other embodiments of the present invention, such monomers represent at least 20 weight percent of an adhesive Part A, exclusive of non-reactive diluents or filler particles. In some embodiments, such monomers represent from 30 to 80 weight percent of an adhesive Part A, exclusive of non-reactive diluents or filler particles. Such monomers operative in the present invention illustratively include methylmethacrylate, $C_1$ to $C_{16}$ alkylacrylate, $C_1$ to $C_{16}$ alkyl methacrylate, $C_1$ to $C_{16}$ hydroxyl alkylacrylates, $C_1$ to $C_{16}$ amine acrylates, $C_1$ to $C_{16}$ secondary amine acrylates, $C_1$ to $C_{16}$ alkyl acrylic acids, epoxy $C_1$ to $C_{16}$ acrylates or methacrylates. Specific acrylate and methacrylate monomers operative herein in addition to aforementioned monomers include acrylate- and methacrylate-ester monomers. Acrylate-ester monomers and methacrylate-ester monomers operative herein illustratively include methyl(meth)acrylate, ethyl(meth)acrylate, isobornyl (meth)acrylate, butyl(meth)acrylate, octyl(meth)acrylate, ethyl hexyl (meth)acrylates, dodecyl (meth)acrylate, tetrahydrofurfuryl (meth)acrylate, stearyl (meth)acrylate, lauryl (meth)acrylate, 2-phenoxyethyl (meth)acrylate, methoxy polyethylene glycol mono (meth)acrylate, glycerol formal methacrylate, isodecyl (meth)acrylate, cyclic trimethylolpropane formal (meth)acrylate, trimethylcyclohexyl (meth)acrylate, caprolactone (meth)acrylate, tridecyl (meth) acrylate, cyclohexyl (meth)acrylate, 2-hydroxyl ethylacrylate, 2-hydroxyl (meth)acrylate, 3-hydroxyl propylacrylate, 1-hydroxyl-2 amino propylmethacrylate, 1-amino-2-hydroxyl propyl methacrylate, acrylamide, 1-amino-3-hydroxy propyl (meth)acrylate, 2-terbutyl amino ethyl (meth)acrylate, methacrylic acid, and glycidyl methacrylate and a combination of any of the aforementioned.

An inventive formulation may also include a di-acrylate or methacrylate monomer, a tri-acrylate or methacrylate, tetra-acrylate or methacrylate, penta-functional acrylate or methacrylate or higher functionality acrylate or methacrylate and carboxylic acid analogs thereof, or a combination thereof. These are synonymously referred to herein as polyfunctional monomers and illustratively a di-, tri-, tetra, penta, or higher functionality (meth)acrylate monomers or resin, such as those selected from polyethylene glycol di(meth)acrylates, bisphenol-A di(meth)acrylates, tetrahydrofurane di(meth)acrylates, hexanediol di(meth)acrylates, polyethylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth)acrylate, pentaerythritol tetra(meth) acrylate, trimethylol propane tri(meth)acrylate, trimethylol propane tri(meth)acrylate, dipentaerythritolmonohydroxypenta(meth)acrylate, pentaerythritol tri(meth)acrylate, ethoxylated bisphenol-A di(meth)acrylate, ethoxylatedtrimethylol propane tri(meth)acrylates, trimethylolpropanepropoxylate tri(meth)acrylates, poly urethane methacrylate resins, or combinations thereof; and other such as detailed in U.S. Pat. Nos. 7,408,012; and 5,376,746, which are hereby incorporated by reference. In those embodiments of the present invention containing polyfunctional monomers, the polyfunctional monomer is typically present on a mole ratio relative to the aforementioned monofunctional monomers (in total) of 0.0-0.05:1 with the ratio modifying the average chain length between cross linkages. It is appreciated that the (meth)acrylate ester polyfunctional monomer is present solely in adhesive Part A in some embodiments while in other embodiments (meth)acrylate ester monomer is present in both Parts A and B of an inventive formulation.

As noted above, embodiments of the inventive formulation include a polyvinyl acetal resin present in at least one of the Part A and Part B. In some inventive embodiments, the polyvinyl acetal resin is greater than 60 percent polyvinyl butyral (PVB) as measured by monomer subunit percentage. In some inventive embodiments, PVB is present from 70 to 88 percent of the monomer subunits. It is appreciated that PVB is an acetal and is formed from the reaction of an aldehyde and alcohol and can include secondary amounts of polyvinyl acetal, ethylene vinyl acetate, polyvinyl acetate and mixtures thereof with the proviso the combination of the secondary amounts is less than 30 monomer subunit percent of the polyvinyl acetal resin. The polyvinyl acetal resin being present as a block co-polymer, copolymer, or a combination of different types of homopolymers. A polyvinyl acetal resin with a majority by monomer subunits PVB typically has a molecular weight ranging from 10,000 to 120,000 and is commonly added as particulate soluble in the other constituents. The polyvinyl acetal resin with a majority by monomer subunits PVB typically has a hydroxyl content in the range of 0 to 25 monomer subunit percent. A polyvinyl acetal resin with a majority by monomer subunits PVB typically has a glass transition temperature (Tg) of between 6° C. and 104° C. A polyvinyl acetal resin with a majority by monomer subunits PVB typically has a particle size of from 1 to 10,000 microns.

Without intending to be bound to a particular theory, inclusion of polyvinyl acetal resin with a majority by monomer subunits PVB in suitable amounts provides improved values for one or more adhesive strength, bond strength, tensile modulus, adhesion durability, T-peel, strain to failure, or lap shear. It is appreciated that of polyvinyl acetal resin with a majority by monomer subunits PVB is present as a component of an adhesive part, an activator part, or both parts of an inventive formulation. In specific embodiments of the present invention, a polyvinyl acetal resin with a majority by monomer subunits PVB is present only in an adhesive part but it is appreciated that the amount of PVB present depends on characteristics of the PVB as well as the weight ratio between adhesive:activator parts (synonymously referred to herein as Parts A:B), typical loadings of PVB in a fully formulated inventive adhesive range from 1-30 total weight percent, adhesive:activator formulation, when present and exclusive of non-reactive diluents or filler particles.

In some inventive embodiments, an induction agent is provided that is a sulfonyl chloride. Sulfonyl chlorides operative herein illustratively include chlorosulfonated polyethylene, tosyl chloride, methanesulfonyl chloride, benzenesulfonyl chloride, $C_2$-$C_{14}$ alkylsulfonyl chloride, and $C_7$-$C_{14}$ arylsulfonyl chloride, or a combination thereof, where an alkyl is intended to include linear, branched, cyclic, structures, as well as the aforementioned structures with pendant groups therefrom, while aryl groups include diaryls and monoaryls inclusive of pendant groups. A sulfonyl chloride is present in the present invention in Part A in either unprotected or encapsulated form, while a sulfonyl chloride is present in Part B only in encapsulated form. Typical loading of an induction agent, if present, ranges from 0.1 to 15 total weight percent of a combined Part A and Part B.

It is appreciated that the sulfonyl chlorides can be used in combination with chain transfer agents, and/or multifunctional chain transfer agents to adjust work time of the resulting formulation.

In some inventive embodiments, the sulfonyl chloride is combined with a reducing agent such as 3,5-diethyl-1-phenyl-2-propyl-1,2 dihydropyridine (PDHP). The reaction therebetween is detailed U.S. Pat. No. 4,182,644.

In still other inventive embodiments, the induction agent includes a free radical initiator of one or more of organic peroxides, organic hydroperoxides, peresters, and peracids. Specific free radical initiators operative herein illustratively include benzoyl peroxide, cumene hydroperoxide, tertiary butyl hydroperoxide, dicumyl peroxide, tertiary butyl peroxyacetate, tertiary butyl perbenzoate, and mixtures thereof. Typically, the free radical initiators are present in amounts of from 0 to 10 percent by weight of the fully formulated adhesive composition.

The free radical initiator is commonly used under condition in which it undergoes a redox reaction with an amine, followed by homolysis. An amine compound reactive with the free radical initiator is typically a secondary or tertiary amine compound in which an amino group is bonded to an aryl group. Specific examples include N, N-dimethyl-p-toluidine, N, N-dimethylaniline. N-(2-hydroxyethyl) aniline, N, N-di (2-hydroxyethyl)-p-toluidine, N-methylaniline, N-(4-methoxyphenyl)pyrrolidine, N-methyl-p-toluidine, and the like.

In some inventive embodiment, a cure accelerator is present in the part opposite a free-radical polymerization initiator. The cure accelerator operative herein illustratively includes an organic salts of transition metals, reducing agents, and compounds containing a labile chlorine. The cure accelerator is limited only by the desired kinetics of free radical polymerization and compatibility with other inventive composition components. Cure accelerators operative herein illustratively include cobalt naphthenate, dimethylamino pyridine; polyethyleneimine, N,N-dimethylaniline, modified dihydropyridines such as 3,5-diethyl-1,2-dihydro-1-phenyl-2-propylpyridine, 2-methylimidazole, 2-hydroxyethyl p-toluidine, ethanolamine, diethanolamine, diethylethanolamine, methyldiethanolamine, butyldiethanolamine, diethylamine, triethylamine, n-butylamine, 2,2-bipyridine, 1,10-phenanthroline, ammonia, alkylidene malonate, δ-iminomalonate, ethylazan, phenylamine, benzylamine, 1-benzofuran-2-amine, 4-quinolylamine, pentane-1,2,5-triamine, benzene-1,2,4,5-tetramine, bis(2-chloroethyl)amine, butyl (ethyl)methylamine, (2-chloroethyl)(propyl)amine, hexane-1-imine, isopropylidene amine, ethane-1,2-diimine, carbodiimide, o-acetylhydroxyamine, o-carboxyhydroxylamine, hydroxylamine-o-sulfonic acid, o-hydroxyaniline, phenylpropanolamine hydrochloride, catecholamine, indoleamine, polyacrylamine, azoisobutyric acid dinitrile, bis(tolysulfonmethyl)-benzyl amine, diisopropanol-p-toluidine, diethanol-p-toluidine, dimethyl aniline, p-halogenated aniline derivatives, dimethyl-p-toluidine and combinations thereof. Without intending to be bound to a particular theory, the accelerator is believed to react to decompose the organic peroxide increase the cure rate of the adhesive. Typical loadings of a cure accelerator in an inventive formulation are from 0.0001 to 4 total weight percent of a fully formulated adhesive and exclusive of non-reactive diluents or filler particles. It is appreciated that in some inventive embodiments the cure accelerator or amine is present in an encapsulant. An encapsulant operative herein is detailed in U.S. Pat. No. 3,396,116, the details of which are hereby incorporated by reference.

An impact modifier is typically present in an inventive formulation and the term is intended to encompass styrene-butadiene rubber, isoprene rubber, polyisobutylene rubber, isobutylene isoprene rubber, and combinations thereof. An impact modifier operative herein illustratively includes methacrylate-butadiene-styrene, nitrile rubber, a block copolymer of styrene or α-methyl styrene, and butadiene or hydrogenated butadiene, acrylonitrile butadiene styrene (ABS), natural rubber, silicones, and combinations thereof. It is appreciated that the impact modifier is readily provided as a core-shell construct. The loading of an impact modifier depends on factors including weight ratio between adhesive part and activator part, impact modifier molecular weight, and impact modifier modulus. It is appreciated that impact modifier molecular weight is only relevant if the impact modifier is not core/shell while primary particle size tends to be the most relevant factor when the impact modifier is a core/shell construct. Maintaining a desired viscosity as to Parts A or B is also relevant in the loading of either linear, branched, or core/shell impact modifiers.

Typical impact modifier loadings in adhesive:activator weight ratio formulation range from 3 to 24 total weight percent when present and exclusive of non-reactive diluents or filler particles. In certain inventive embodiments, the impact modifier is present as a rubber component in combination with a toughening agent. In still other embodiments, the impact modifier is segregated into an activator, Part B of an inventive formulation, yet still serves to modify the failure mode of the cured adhesive.

An inventive formulation in some inventive embodiments also includes a toughening agent to further bolster the polyvinyl acetal resin with a majority by monomer subunits PVB. The toughening agent is different in properties from the impact modifier and, if present, can significantly improve the performance of cured adhesives at low temperatures such as −40° F. (−40° C.) and at the same time does not cause a negative effect on the performance of cured adhesives at elevated temperatures such as 180° F. whereas core-shell structured impact modifiers provide not only excellent impact strength but also non-sag, excellent thixotropic property and improved anti-sliding performance.

Toughening agents operative herein illustratively can be chosen from a wide variety of elastomeric materials that form discrete particles or biphasic domains in a continuous resin matrix. For example, pre-reacted particles, polyacrylate, styrene/ethylene/styrene, α-methyl styrene/ethylene/α-methyl styrene, α-methyl styrene/butadiene/α-methyl styrene, styrene/butadiene/styrene (SBS) copolymers, styrene/isoprene/styrene (SIS) copolymers, styrene/butadiene (SBR) copolymers, styrene acrylonitrile (SAN), as well as other pre-reacted materials is added in particulate form to the resin composition. A partial listing of useful pre-reacted elastomer rubbers includes pre-reacted elastomer particles include acrylate butadiene; butadiene; chloroprene; ethylene-propylene; ethylene-propylene-diene; isoprene; isobutylene; isobutylene isoprene (butyl rubber); styrene-butadiene; styrene-isoprene; acrylonitrile-butadiene; acrylonitrile-chloroprene; vinyl-terminated polybutadienes such as vinylpyridine-butadiene, vinylpyridine-styrene-butadiene; carboxylic-styrenebutadiene; chloro-isobutylene-isoprene (chlorobutyl rubber); bromo-isobutylene-isoprene (bromobutyl rubber); dialkysiloxane, polypropylene oxide); polyester urethanes; polyether urethanes; and mixtures thereof. Moreover, reactive liquid polymers (RLP's) also can be incorporated as the toughening agent. RLP's contain functional groups, usually on their terminal ends but occasionally as pendant groups, and react with the resin in situ to form elastomeric domains. Examples of RLP's include, without limitation, vinyl terminated acrylonitrile butadiene (VTBN), carboxylterminated butadiene acrylonitrile (CTBN), amine-terminated butadiene acrylonitrile (ATBN), hydroxyl-terminated butadiene acrylonitrile (HTBN), epoxy-terminated butadiene acrylonitrile (ETBN), mercapto-terminated butadiene acrylonitrile (MTPN), and phenoxy-terminated butadiene acrylonitrile (PTBN). In specific embodiments of the present invention, the toughening agent includes chloro-sulphonated polyethylene, polychloroprene, copolymers of ethylene acrylic elastomer, poly (methyl methacrylate)-grafted rubber, butadiene styrene acrylonitrile copolymer or combinations thereof. It is appreciated that a toughening agent is present as a component of an adhesive part, an activator part, or both parts of an inventive formulation. In specific embodiments of the present invention, a toughening agent is present only in an adhesive part, but it is appreciated that the amount of toughening agent present depends on characteristics of the toughening agent as well as the weight ratio between adhesive:activator parts, typical loadings of toughening agent in a fully formulated inventive adhesive range from 0 to 20 total weight percent when present and exclusive of non-reactive diluents or filler particles.

In order to formulate an inventive adhesive formulation that achieves high strength without the need for a separate surface treatment prior to application of an inventive formulation, an adhesion promoter is provided within an inventive formulation. The adhesion promoter facilitates adhesion of a fully cured formulation of various substrates including galvanized substrates. An adhesion promoter is readily formulated into either an adhesive part, an activator part, or both parts of an inventive formulation. In specific embodiments, the adhesion promoter is found only in the adhesive part. Specific adhesion promoters operated in an inventive formulation illustratively a phosphate ester, a monofunctional phosphate, a difunctional phosphate, polymeric phosphate functionalized polymer, an meth(acrylic) acid, polymeric material with organic acid functionality, maleic acid, itaconic acid, acid functionalized polymer such a malenized polybutadiene, citric di- or tri-methacrylates, polymethacrylated oligomaleic acid, poly methacrylated polymaleic acid, poly methacrylated poly methacrylic acid or a combination thereof. The context of a functional phosphorus-containing compounds, functional refers to inclusion of a polymerizable moiety. Typical loadings of adhesion promoter in an inventive formulation are from 0.5 to 10 total weight percent of a fully formulated adhesive with the amount being largely independent of the weight ratio between adhesive part: activator part and exclusive of non-reactive diluents or filler particles.

Phosphorus-containing compounds operative herein include mono-esters of phosphinic, mono- and di-esters of phosphonic and phosphoric acids having one unit of vinyl or allylic unsaturation present. Phosphorus-containing adhesion promoters operative herein illustratively include phosphoric acid; 2-methacryloyloxyethyl phosphate; bis-(2-methacryloxyloxyethyl)phosphate; 2-acryloyloxyethyl phosphate; bis-(2-acryloyloxyethyl)phosphate; methyl-(2-methacryloyloxyethyl)phosphate; ethyl methacryloyloxyethyl phosphate; methyl acryloyloxyethyl phosphate; ethyl acryloyloxyethyl phosphate; propyl acryloylbxyethyl phosphate, isobutyl acryloyloxyethyl phosphate, ethylhexyl acryloyloxyethyl phosphate, halopropyl acryloyloxyethyl phosphate, haloisobutyl acryloyloxyethyl phosphate or haloethylhexyl acryloyloxyethyl phosphate; vinyl phosphonic acid; cyclohexene-3-phosphonic acid; (α-hydroxybutene-2 phosphonic acid; 1-hydroxy-1-phenylmethane-1,1-diphosphonic acid; 1-hydroxy-1-methyl-1-disphosphonic acid: 1-amino-1phenyl-1,1-diphosphonic acid; 3-amino-3-hydroxypropane-1,1-disphosphonic acid; amino-tris(methylenephosphonic acid); gamma-amino-propylphosphonic acid; gamma-glycidoxypropylphosphonic acid; phosphoric acid-mono-2-aminoethyl ester; allyl phosphonic acid; allyl phosphinic acid; β-methacryloyloxyethyl phosphinic acid; diallylphosphinic acid; β-methacryloyloxyethyl)phosphinic acid, allyl methacryloyloxyethyl phosphinic acid, and combinations thereof. Typical loadings of an adhesion promoter range from 0.3 to 5 total weight percent.

As is conventional for acrylic two part adhesives, cure occurs through the combination of the A-side and the B-side. This system is co-reactive at ambient conditions on mixture of Parts A and B to initiate addition polymerization reactions and cure the adhesive. Substantially any of the known oxidizing and reducing agents which are co-reactive at ambient conditions in air are operative herein with the proviso that they a storage compatible with the polyvinyl acetal resin and the other formulation constituents.

In some inventive embodiments, an anti-oxidant is present in an adhesive and without intending to be bound to a particular theory is believed to function as a cure inhibitor to mitigate premature cure. An antioxidant operative herein illustratively includes butylated hydroxyanisole, 2,6-di-t-butyl cresol, 2,2'-methylene bis(6-t-butyl-4-methyl phenol), 2,2'-thio bis(6-t-butyl-4-methyl phenol), tert-butyl hydroquinone, di-tert-butyl hydroquinone, di-tert-amyl hydroquinone, methyl hydroquinone, p-methoxy phenol, tetrakis [methylene-3-(3',5'-di-tert-butyl-4'-hydroxyphenyl) propionate]methane, N-(2-aminoethyl)-3-[3,5-bis(tert-butyl)-4-hydroxyphenyl]propanamide, 5,7-di-tert-butyl-3-(3,4,-dimethylphenyl)-3H-benzofuran-2-one, dilauryl thiodipropionate, dimyristyl thiodipropionate, tris(nonylphenyl) phosphite, and combinations thereof. Typical loadings of an anti-oxidant in an inventive formulation are from 0.1 to 6 total weight percent of a fully formulated adhesive and exclusive of non-reactive diluents or filler particles.

An inventive formulation in certain embodiments also includes various chelating agents, corrosion inhibitors, oxidizing agents, reducing agents, thickeners, pigments, thixotropic agents, plasticizers, antioxidants, fillers, fire retardants, carriers, and combinations thereof. Such additives are limited only by the requirement of compatibility with the other components of an inventive formulation. Such additives are provided to balance or otherwise modify at least one property of an inventive formulation as to handling, storage, cure rate, or adhesive properties.

Non-conductive particulate fillers operative in embodiments of the adhesive illustratively include hollow glass microspheroids, calcium carbonate, calcium silicate, alumina, alumina trihydrate (ATH), silica, talcs, dolomite, vermiculite, diatomaceous earth, kaolin clay, and combinations thereof. Factors relevant in the choice of a particulate filler illustratively include filler cost, resultant viscosity of flow properties, resultant shrinkage, surface finish weight, flammability, and chemical resistance of the thermoset formulation. Typical filler sizes are from 0.1 to 50 microns.

Conductive fillers used in addition to, or in place of non-conductive particulate filler in embodiments of the inventive formulation illustratively include carbon black, graphene, ceramics, and metals.

A carrier is provided in some inventive embodiments in either the Part A, Part B, or both to modify viscosity and simply an inert solvent or diluent such as methylene chloride, or butyl benzyl phthalate, including mixtures of such solvents or diluents. The carrier contains no more than 5% by weight of any moiety which is reactive with the oxidizing agent at room temperature.

Typical component amounts for an inventive adhesive are provided in Tables 1A and 1B for Parts A and B, respectively.

Tables 1A and 1B. Typical component amounts for adhesive (Part A) and activator (Part B), where amounts are given in weight percentages unless otherwise noted:

TABLE 1A

| ADHESIVE (Part-A) | |
|---|---|
| Component: | (10:1 Ratio) |
| Reactive monomers or oligomers | >20 |
| Polyfunctional monomer or resin | 0-5% of monomer+ |
| polyvinyl acetal resin >50 precent polyvinyl butyral (PVB) | 1-30* |
| Induction additive | 0-6* |
| Impact Modifier | 0-48* |
| Adhesion promoter | 1-20 |
| 2' toughening agent | 0-40* |
| Anti-oxidant | 0-12* |
| Polymerization accelerator | 0.1-6 |
| Carrier/other additives | 0-remainder |

*Denotes a component that is present in either Part A or Part B, or both Parts A and B

TABLE 1B

| ACTIVATOR (Part B) | |
|---|---|
| Component: | (10:1 Ratio) |
| Inert carrier | 0-60 |
| Polyfunctional monomer or resin | 0-60 |
| polyvinyl acetal resin >50 precent polyvinyl butyral (PVB) | 0-30* |
| Anti-oxidant | 0-12* |
| Free-radical polymerization initiator | 0.1-40 |
| 2' toughening agent | 0-40* |
| Impact Modifier | 0-48* |
| Carrier/other additives | 0-remainder |

*Denotes a component that is present in either Part A or Part B, or both Parts A and B Tables 2A and 2B. Typical component amounts for adhesive (Part A) and activator (Part B), where amounts are given in weight percentages unless otherwise noted:

TABLE 2A

| ADHESIVE (Part-A) | |
|---|---|
| Component: | (1:1 Ratio) |
| Reactive monomers or oligomers | >20 |
| Polyfunctional monomer or resin | 0-5% of monomer + comonomer |
| polyvinyl acetal resin >50 precent polyvinyl butyral (PVB) | 1-30* |
| Induction additive | 0-6* |
| Impact Modifier | 0-48* |
| Adhesion promoter | 1-20 |
| 2' toughening agent | 0-40* |
| Anti-oxidant | 0-12* |
| Free-radical polymerization initiator | 0.6-6 |
| Carrier/other additives | 0-remainder |

*Denotes a component that is present in either Part A or Part B, or both Parts A and B

TABLE 2B

| ACTIVATOR (Part B) | |
|---|---|
| Component: | (1:1 Ratio) |
| Reactive monomers or oligomers | >20 |
| Polyfunctional monomer or resin | 0-5% of monomer + comonomer |
| polyvinyl acetal resin >50 precent polyvinyl butyral (PVB) | 0-30* |
| Anti-oxidant | 0-12* |
| Polymerization accelerator | 0.0002-8 |
| 2' toughening agent | 0-40* |
| Impact Modifier | 0-48* |
| Carrier/other additives | 0-remainder |

*Denotes a component that is present in either Part A or Part B, or both Parts A and B A process is provided for producing an adhesive formulation produced by free radical polymerization that bonds well to the aforementioned substrates. An inventive formulation is a two-part formulation that is either premixed to initiate a time period pot life, or alternatively the two parts are co-applied to a substrate under conditions for polymerization to occur between the various monomers. In specific inventive embodiments, polymerization occurs at 24° C. in ambient atmosphere or in other embodiments, polymerization is initiated by energy inputs such as heating, ultraviolet radiation exposure or other free radical formation mechanisms. In certain inventive embodiments in which the adhesive Part A, and activator Part B are present in a 10:1 or 1:1 volumetric ratio ±10%, storage stability of more than 365 days at 23° C. is obtained.

In some inventive embodiments, an inventive formulation is provided as multipack or two-part adhesive systems where one package contains the Part A and the other contains the Part B. The two parts are mixed together at the time of use in order to initiate the reactive cure. Two-chambered cartridges equipped with static mixers in the nozzle, and for larger scale application, meter mix dispensing equipment are suitable to apply the mixed, uncured adhesive. After mixing the individual packages, one or both surfaces to be joined are coated with the mixed adhesive system and the surfaces are placed in contact with each other.

The adhesive coatings may be brushed, rolled, sprayed, dotted, knifed, cartridge-applied, especially from a dual cartridge; or otherwise applied to one substrate, or applied to both substrates to desired thickness. The substrates may be clamped for firmness during cure in those installations where relative movement of the two substrates might be expected.

Regardless of the form of an inventive formulation, upon induction of pot life for the formulation, the formulation is present in simultaneous contact with two or more substrates with the substrates held in contact with the curing inventive formulation for an amount of time sufficient to achieve a bond between the substrates. An inventive formulation is well-suited for bonding galvanized substrates, cold rolled steel, aluminum, PVC, ABS, mild steel, vinyl polymers, wood, and fiberglass. Two such substrates can be brought together to form various adjoined structures such as a lap joint, butt joint, corner joint, edge joint, and T-joint. In still other embodiments, an inventive formulation is applied to a single substrate and allowed to cure to form a coating that offers substrate protection or is operative as a primer for subsequent material applications. As an inventive formulation cures through a free radical mechanism, an inventive formulation can be applied to a variety of thicknesses and still achieve polymerization throughout. Typical thicknesses of an inventive formulation between substrates range from 0.001 to 25 millimeters (mm).

EXAMPLES

Examples 1-3

For the adhesives outlined in Table 3A, ingredients 1-6 were combined and mixed using a high-speed dispersing blade at 2,000 rpm until homogeneous. Ingredient 7 was added to the mixture slowly with mixing to prevent clumping and mixing was continued for 3-5 minutes until no signs of clumped material remained. Mixing was stopped and the adhesive was left to stand for 4 hours, after which it was mixed again at 2,000 rpm for an additional 3-5 minutes until all signs of graininess had disappeared. The finished adhesive was allowed to cool to room temperature and then degassed under vacuum to remove entrained air.

For the activator outlined in Table 3B, ingredients 1 and 2 were combined and mixed using a high-speed dispersing blade at 2,000 rpm until homogeneous. Ingredient 3 was added to the mixture slowly with mixing to prevent clumping and mixing was continued until the mixture reached 160° F. Mixing was stopped and the mixture was left to stand for a minimum of 8 hours. Mixing at 2,000 rpm was resumed until the cooled batch reached 140° F. The mixture was cooled to under 90° F. Ingredients 4-6 were added, and the activator was mixed at 2,000 rpm until homogeneous. Once cooled to room temperature, the finished activator was degassed to remove entrained air.

TABLE 3A

| Adhesive (Part A) | | | |
|---|---|---|---|
| Ingredient # | Raw Ingredient | Exs. 1-2-3 wt % | Exemplary Function |
| 1 | Elastomer premix of Polychloroprene (25 wt. %) in MMA monomer | 71.3-66-58 | Toughening agent |
| 2 | Methacrylate monomer (MMA) | 5-10-12 | monomer |
| 3 | Methacrylic acid monomer | 3-5-7 | Adhesion promoter/monomer |
| 4 | N,N-dimethyl-p-toluidine (DMPT) | 0.5-1.0-1.8 | Reducing agent |
| 5 | 1,4-Naphthoquinone 5% by wt. in MMA | 0.2-0.3-0.6 | Antioxidant/ preservative |
| 6 | ethylene diamine tetraacetic acid tetrasodium salt (EDTA) 5% by wt. in 50/50 by wt. ethylene glycol/water | 1-0.7-0.5 | Metal scavenger |
| 7 | Methylmethacrylate-. Butadiene-Styrene Copolymer (MBS) | 19-17-20.1 | Impact modifier |
| | Total | 100-100-100 | |

TABLE 3B

| Activator (Part B) | | | |
|---|---|---|---|
| Ingredient # | Raw Ingredient | Exs. 1-2-3 wt % | Exemplary Function |
| 1 | Epoxy resin | 15-20-10 | Reactive diluent |
| 2 | 15.5% by wt. Styrene-Ethylene/Butylene-Styrene in diisodecyl adipate | 30-25-20 | Toughening agent |
| 3 | Methylmethacrylate-. Butadiene-Styrene Copolymer (MBS) | 9-13-17 | Impact modifier |
| 4 | Magnesium sulfate, anhydrous | 1-2-2.6 | Water scavenger |
| 5 | Blue pigment in plasticizer | 0-0.6-0.4 | colorant |
| 6 | 55% by wt. BPO in water/plasticizer | 45-40-50 | Oxidizing agent |
| | Total | 100 | |

Examples 4-9 and Comparative Example A

A base formulation is prepared as detailed in Table 3 with a fixed weight percentage of an elastomer premix in reactive monomer. The specifics of the comparative polychloroprene (Comparative Example A) and the inventive Examples 4-7 are detailed in Table 4.

TABLE 4

Combinations of monomers and elastomer premixes used in Examples 4-9 and Comparative Examples A and B.

| Example | Reactive acrylic monomer | Elastomer Premix in monomer | MBS Core/Shell Impact Modifier |
|---|---|---|---|
| Comparative A | Methyl methacrylate | 16% Polychloroprene premix with Mooney viscosity of~100 in methyl methacrylate (MMA) | A |
| Comparative B | Methyl methacrylate | 16% Polychloroprene premix with Mooney viscosity of~100 in methyl methacrylate (MMA) | B |
| 4 | Methyl methacrylate | 16% PVB (86% butyral, 12% hydroxyl, and~2% acetyl functionality) in MMA | A |
| 5 | Methyl methacrylate | 20% PVB (86% butyral, 12% hydroxyl, and~2% acetyl functionality) in MMA | A |
| 6 | Methyl methacrylate | 30% PVB (~84% butyral, ~13% hydroxyl, and <5% acetyl functionality) in MMA | B |
| 7 | Methyl methacrylate | 20% PVB (~79% butyral, ~20% hydroxyl, and <3% acetyl functionality) in MMA | B |
| 8 | Glycerol formal methacrylate (GLYFOMA) | 20% PVB (~84% butyral, ~13% hydroxyl, and <5% acetyl functionality) in GLYFOMA | B |
| 9 | Glycerol formal methacrylate (GLYFOMA) | 15% PVB (~84% butyral, ~13% hydroxyl, and <5% acetyl functionality) in GLYFOMA | B |

A-Methylmethacrylate-Butadiene-Styrene (MBS) copolymer dispersed in liquid curable resin and not conventional powder type core-shell
B-MBS core-shell structure consists of a butadiene-based rubber core, and a methyl methacrylate styrene graft polymer shell covering the core.

The adhesive formulations of each Example are tested for work time and peak exotherm time (denoted in the following tables as exo time) with an activator as prepared in Table 3B. Peak exotherm is the maximum temperature achieved during the cure process. A standard mixture ratio of Table 3 Part A to commercial Part B of 7.5:1 is used. A speed mix protocol of 2500 rpm for 10 seconds is used. The results of these tests are provided in Table 6.

TABLE 5

Test results of the Comparative Example A and Examples 4-9 after speed mixing.

| Example | Open (work) time (min) | Exo time (min) | Peak temp. (° F.) |
|---|---|---|---|
| Comparative A | 5.5 | 9.08 | 251 |
| Comparative B | 4 | 9.17 | 236 |
| 4 | 6 | 7.65 | 256 |
| 5 | 4 | 5.98 | 249 |
| 6 | 4.5 | 5.90 | 262 |
| 7 | 4.5 | 6.68 | 247 |
| 8 | <<1 | 2.02 | 250 |
| 9 | <<1 | 1.82 | 257 |

Notably, Examples 3-8 have peak exotherm times that are equal to, or faster than the control formulation containing polychloroprene (Comparative Examples A & B). Because the peak exotherm times of the formulations containing the MMA monomers of Comparative Examples 3-7 are closest to the peak exotherm times of the polychloroprene controls of Comparative Examples A and B, these Examples are tested for lap shear strength. Each adhesive is applied onto 0.06" thick 6061-T6 aluminum coupons that have been grit-blasted and treated with Plexus PC-120 Cleaner. Glass beads (0.03") are applied to the wet adhesives. Second similarly-treated aluminum coupons are applied, and the adhesives were compressed to a bond area of 1"×0.5"×0.03". The adhesives are allowed to cure for 7 days at ambient temperature and humidity. After 7 days, the cured coupons were pulled according to ASTM D1002. The results are shown in Table 6.

TABLE 6

Lap Shear Strength results of Comparative Examples A & B and Examples 4-7.

| Example | Lap Shear Strength, psi | Failure mode |
|---|---|---|
| Comparative A | 2,712 ± 71 | Thin cohesive |
| Comparative B | 2,790 ± 35 | Adhesive |
| 4 | 3,817 ± 249 | Thin cohesive |
| 5 | 3,547 ± 65 | Thin cohesive |
| 6 | 3,669 ± 223 | Adhesive/thin cohesive |
| 7 | 3,703 ± 163 | Adhesive |

Notably, the inventive formulation of Examples 6 and 7 are greater than 27% stronger than the strongest polychloroprene control formulation of Comparative Example B. Lap shear strength of between 3,000 and 5,000 psi are noted for the cured formulations according to the present invention at 4 mils thickness and in excess of values obtained for conventional acrylic adhesives lacking polyvinyl acetals used herein.

Tensile tests are run on Comparative Example 1 and Examples 4, 6, and 7. Castings of 0.1" thickness were prepared by mixing adhesive and activator though a static mix nozzle out of a 10:1 v:v cartridge. Castings were allowed to cure for 7 days at ambient temperature and humidity. Tensile bars were prepared and tested according to ADTM D638-10 with the results of such tensile tests shown in Table 7.

TABLE 7

Tensile test results of Comparative Example 1 and Examples 4, 6, and 7.

| Example | Tensile (psi) | Max elongation (%) |
|---|---|---|
| Comp. 1 | 3,329 ± 64 | 92 |
| 4 | 5,538 ± 203 | 62 |
| 6 | 3,857 ± 73 | 5 |
| 7 | 5,083 +/− 36 | 44 |

For comparison, typical specifications for tensile of an acrylic adhesive is 2,700 to 3,400 psi. Tensile of between 3,800 and about 5,700 psi are noted for the inventive cured formulations at 4 mils thickness according to the present invention and in excess of values obtained for conventional acrylic adhesives lacking polyvinyl acetals used herein.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

The invention claimed is:

1. A two-part formulation of a high strength acrylic adhesive comprising:

a Part A comprising at least one curable monomer of: at least one of: Part A acrylate monomer, methacrylate monomer, acrylic acid monomer, methacrylic acid monomer, or a combination thereof; a Part A impact modifier; a Part A adhesion promoter; and a Part B comprising a Part B impact modifier; and a Part B adhesion promoter, and an induction agent;

polyvinyl acetal resin that is greater than 60 percent polyvinyl butyral (PVB) as measured by monomer subunit percentage present in at least one of Part A or Part B, said polyvinyl acetal resin present upon mixing of said Part A and said Part B in an amount of from 1 to 30 total weight percent and having a peak exotherm time during cure of less than 7.65 minutes.

2. The high strength acrylic adhesive of claim 1 wherein said Part A acrylate monomer, methacrylate monomer, acrylic acid monomer, methacrylic acid monomer, or a combination thereof is the same as a Part B acrylate monomer, a Part B methacrylate monomer, a Part B acrylic acid monomer, a Part B methacrylic acid monomer, or a combination thereof.

3. The high strength acrylic adhesive of claim 1 wherein said Part A impact modifier is the same as said Part B impact modifier.

4. The high strength acrylic adhesive of claim 1 wherein said Part A adhesion promoter is the same as said Part B adhesion promoter.

5. The high strength acrylic adhesive of claim 1 wherein said polyvinyl acetal resin is present in both said Part A and said Part B.

6. The high strength acrylic adhesive of claim 1 wherein said polyvinyl acetal resin has a molecular weight ranging from 10,000 to 120,000 average number molecular weight.

7. The high strength acrylic adhesive of claim 1 wherein said polyvinyl acetal resin has a glass transition temperature of between 66° C. and 104° C.

8. The high strength acrylic adhesive of claim 1 wherein said polyvinyl acetal resin has particle size of from 1 to 10,000 microns.

9. The high strength acrylic adhesive of claim 1 further comprising reactive methacrylate phosphate monomer or oligomer in a fully formulated inventive adhesive present in a range from 5-15 total weight percent.

10. The high strength acrylic adhesive of claim 1 wherein said part B further comprises at least one curable monomer of: Part B acrylate monomer, methacrylate monomer, acrylic acid monomer, methacrylic acid monomer, or a combination thereof.

11. The high strength acrylic adhesive of claim 10 wherein said Part A and said Part B are mixed in a ratio of 1:1 or 10:1.

12. A process of applying the adhesive to a substrate comprising:

mixing together the components of claim 1 to form an adhesive mixture;

applying said adhesive mixture to the substrate;

contacting a second substrate with said adhesive mixture; and allowing said adhesive mixture to cure to create a bond between the substrate and the second substrate.

13. The process of claim 12 where cure occurs at a temperature of between 10° C. and 25° C.

14. A structure comprising:

a first substrate;

a second substrate; and a cured formulation of claim 1 having a thickness and adhesively bonding said first substrate to said second substrate.

15. The structure of claim 14 wherein the thickness is between from 0.001 to 25 millimeters.

16. The structure of claim 14 wherein at least one of said first substrate and said second substrate is metal.

17. The structure of claim 14 wherein said cured formulation has a tensile of from 3,800 and about 5,700 psi.

18. A two-part formulation of a high strength acrylic adhesive comprising:

a Part A comprising at least one curable monomer of: at least one of: Part A acrylate monomer, methacrylate monomer, acrylic acid monomer, methacrylic acid monomer, or a combination thereof; a Part A impact modifier; a Part A adhesion promoter; and a Part B comprising a Part B impact modifier; and a Part B adhesion promoter, and an induction agent;

polyvinyl acetal resin that is 70 to 88 percent polyvinyl butyral (PVB) as measured by monomer subunit percentage present in at least one of Part A or Part B, said polyvinyl acetal resin present upon mixing of said Part A and said Part B in an amount of from 1 to 30 total weight percent.

19. A two-part formulation of a high strength acrylic adhesive comprising:

a Part A comprising at least one curable monomer of: at least one of: Part A acrylate monomer, methacrylate monomer, acrylic acid monomer, methacrylic acid monomer, or a combination thereof; a Part A impact modifier; a Part A adhesion promoter; and a Part B comprising a Part B impact modifier; and a Part B adhesion promoter, and an induction agent;

polyvinyl acetal resin that is greater than 60 percent polyvinyl butyral (PVB) as measured by monomer subunit percentage present in at least one of Part A or Part B, said polyvinyl acetal resin present upon mixing of said Part A and said Part B in an amount of from 1 to 30 total weight percent, and said polyvinyl acetal resin having secondary amounts of polyvinyl acetal, ethylene vinyl acetate, polyvinyl acetate, polyvinyl hydroxide, and mixtures thereof.

* * * * *